United States Patent [19]
Silverman

[11] Patent Number: 5,883,491
[45] Date of Patent: Mar. 16, 1999

[54] METHOD AND APPARATUS FOR DEPOSITING AN ELECTRICAL CHARGE TO AN ELECTRICAL STORAGE CELL USED IN AN AUTOMOBILE

[76] Inventor: Martin S. Silverman, 854 Vista Arriago, Camarillo, Calif. 93012

[21] Appl. No.: 812,237

[22] Filed: Mar. 6, 1997

[51] Int. Cl.⁶ .................................................. H02J 7/00
[52] U.S. Cl. ............................................ 320/104; 320/107
[58] Field of Search .............................. 320/4, 5, 2, 107, 320/103, 104, 105, 117, 124, 101, 112, 113

[56] References Cited

U.S. PATENT DOCUMENTS

| | | | |
|---|---|---|---|
| 4,540,929 | 9/1985 | Binkley | 320/104 |
| 5,276,393 | 1/1994 | Gali | 320/101 |
| 5,497,066 | 3/1996 | Drouillard et al. | 320/7 |
| 5,637,978 | 6/1997 | Kellett et al. | 320/104 |
| 5,648,714 | 7/1997 | Eryou et al. | 320/4 X |
| 5,652,497 | 7/1997 | Boivie | 320/4 |
| 5,714,865 | 2/1998 | Thomas | 320/139 |

OTHER PUBLICATIONS

Product Insert: Power It, "*Auto Starter*", Patent Pending No. 08/433,241. Distributed by: Best Products Marketing Group No date on insert or product.

*Primary Examiner*—Peter S. Wong
*Assistant Examiner*—K. Shin
*Attorney, Agent, or Firm*—John L. Rogitz

[57] ABSTRACT

A method and apparatus that provides an efficient way to deposit a charge to a target battery using a small, lightweight, and disposable energy source capable of delivering a high-current and over-voltage which is substantially greater than the voltage of the target battery. The most common application for which the present invention is directed is an automobile battery. The target battery is a secondary battery which has plates submerged in an electrolytic solution. As the target battery discharges, a passivation substance forms on the plates of the target battery. To deposit a charge from the present invention energy source to the target battery, the energy source is electrically connected to the target battery. The energy source has an over-voltage, which is substantially greater than the voltage of the target battery. When the high-current and over-voltage is delivered to the target battery, lead sulfate coating the plates of the target battery is quickly changed into sulfuric acid which is diffused into the adjacent electrolyte.

8 Claims, 4 Drawing Sheets

METHOD AND APPARATUS FOR DEPOSITING AN ELECTRICAL CHARGE TO AN ELECTRICAL STORAGE CELL USED IN AN AUTOMOBILE

DISCLOSURE DOCUMENT PROGRAM

The invention contained in this application was originally disclosed in Disclosure Document Number 406392, filed pursuant to Section 1706 of the Manual of Patent Examining Procedure.

BACKGROUND OF THE INVENTION

1. Field of the Invention

The present invention generally relates to using an external energy source to deposit an electrical charge to an electrical storage cell. More particularly, the invention concerns an apparatus and method for delivering energy to an electrical storage cell—such as an automotive battery—that has dissipated sufficient energy to no longer be able to supply adequate energy for the application into which the storage cell is installed.

2. Description of the Related Art

In an electric storage cell, or battery, chemical energy is converted into electrical energy. Strictly speaking, the word "battery" applies to an assembly of cells, but the word has come to mean single unit or cells. A battery utilizes the potential difference which exists between elements within the cell. When two different elements are immersed in electrolyte, an electro-motive force ("emf") exists tending to send current within the cell from the negative pole, which is more highly electro-positive, to the positive pole. The poles, or electrodes of a battery, form the junction to which an external circuit can be attached to the battery. If the external circuit is closed, current flows from the battery at the positive electrode, or anode, through the external circuit, and enters the battery at the negative electrode, or cathode.

There are two types of batteries: a primary battery and a secondary battery. In a primary battery, the chemical-reacting parts require renewal after use. In a secondary battery, the electro chemical processes are reversible to a high degree, and the chemically reacting parts are restored after partial or complete discharge by reversing the direction of current through the battery. An automotive battery is an example of a secondary battery.

The emf of a battery is the total potential difference between the electrodes on open circuit. When current flows, the potential difference across the terminal drops because of a resistance drop within the cell and because of polarization. Polarization occurs when current flows in the battery and a substance, such as hydrogen, is deposited on the cathode due to the chemical reaction taking place within the batteries. The deposits cause two effects, both of which are well-known in the art, which reduce the terminal voltage of the battery.

A. The Primary Battery

The copper-oxide, zinc, caustic-soda battery is the most widely used primary battery because it is suited for both open- and closed-circuit work. The battery is made in multiple forms, two of which are discussed below. One of the primary batteries has multiple flat plates, and the other, concentric cylindrical plates. In either case, the positive electrode is compressed cupric oxide, the surface of which is reduced to metallic copper, the outside serving as a depolarizer. The negative electrode is zinc, and the electrolyte a strong, caustic-code solution (NaOH). The surface is covered with mineral oil to minimize evaporation. These batteries are used extensively in railroad service and have ratings from 250 to 1000 amp hours (A·h).

The Ruben Cell Battery was developed for devices which require a high ratio of ampere-hour capacity to the volume of the cell at higher current densities than were previously considered practicable. The anode is of amalganized zinc, and the cathode is a mercuric oxide polarizing material intimately mixed with graphite in order to reduce its electrical resistivity. The electrolyte is a solution of potassium hydroxide (KOH) containing potassium zincoid. The cell is made in two forms. In one form, the anode consists of a spirally wound corrugated strip of zinc 0.002 to 0.005 in thickness, which is amalgamated after assembly. Two strips of alkali-resistant absorbent paper are interwound with the zinc foil so that the zinc protrudes at the upper side and the paper at the lower side. The anode is insulated from the steel container by a polystyrene sleeve. The cathode depolarizer is separated from the anode by a barrier alkali-resistant paper. The cell top is copper and contacts the zinc strip to form the negative terminal of the cell. The cell is sealed by insulating grommet of neoprene. The cell container, which is inert chemically to the cell ingredients, forms the positive electrode.

B. The Secondary Battery

In many applications for a storage battery, the electrolytic action must be reversible to a high degree. There are multiple types of storage batteries, three of which are: the lead-acid type, the nickel-iron-alkaline type, and the nickel-cadmium-alkaloid (nicad) type.

In the manufacture of the lead-acid cell batteries which are commonly used in automotive and other mechanical applications, there are two general types of plates, or electrodes. In the Leclanche' type, the active material is electrically formed of pure lead by repeated reversals of the charging current. In the Faure, or pasted plate type, the positive and negative plates are formed by applying a paste, largely of lead oxides ($PbO_2$, $Pb_3O_4$) to lead-antimony supporting grids. A current is passed through the plates while they are immersed in weak sulphuric acid, the positive plates being connected as anodes and the negative plates as cathodes. The paste on the positive plate is converted into lead peroxide while that on the negative plate is reduced to spongy lead.

In order to obtain high capacity-per-unit weight, it is necessary to expose a large plate area to the action of the acid. This is done in the Leclanche' plate by "ploughing" with sharp steel disks, and by using corrugated helical inserts as active positive material. In the pasted plate, a large area of the material is necessarily exposed to the action of the acid.

Between the extremes of complete charge and discharge in either battery, complex combinations of lead and sulphate are formed. After complete discharge, a hard insoluble sulphate forms on the plates, and is almost completely reducible only by slow recharging of the battery.

Portable batteries for automobile starting and lighting, airplanes, industrial trucks, electric locomotives, train lighting, power boats and other recreational vehicles employ the Faure pasted-type plates because of their high discharge rates for a given weight and size. Separators located between the plates are of either treated grooved wood; perforated hard rubber; glass-wool mats; perforated rubber; grooved wood; ribbed micro-porous rubber, or similar materials. For example, in low-priced, short-lived batteries for automobiles, grooved wood alone is used; in the more expensive automotive batteries, the wood is reinforced perforated hard rubber. Contains for the automobile-type starting batteries are typically made from an asphaltic compound or rubber.

There are two common methods currently employed for charging a secondary battery. A constant-current method and a constant-potential method. A common method of charging with constant current is to provide a low-voltage direct current ("DC") power supply. A resistor is then connected in series which may be adjusted to yield required current. The more popular method is to us an alternating current ("AC") power source in conjunction with a copper-oxide or silicon rectifier, since AC power supplies are more common than DC power supplies.

The object of charging a battery is to drive all the lead sulfate formed in the plates on discharge of the battery out of the plates and return it as an acid to the electrolyte. To achieve this result, a direct current is passed through the cell in the opposite direction to that during discharge, liberating the acid from the plates. The liberation of the acid from the plates concentrates the acid in the electrolyte, and when the plates are fully charged, maximizes the acid concentration in the electrolyte.

When a battery is placed on charge, there is a rise in the battery voltage due to an increase in density of electrolytes adjacent to the pores of the active material. A subsequent rise of voltage is governed by the rate in which acid is produced from the plates and the rate of diffusion into the free electrolyte of the cell. A major problem with each of the recharging techniques discussed above is that a storage battery must be recharged for a considerable amount of time in order to liberate the acid from the plate of the battery and concentrate it in the electrolyte; in other words, for the battery to become recharged.

The current method for recharging a battery is to recharge the battery at a high amperage with a low voltage. An example would be jump-starting one automobile from a second automobile. The problem is that a second automobile or a similar large amperage power source is required. Accordingly, it would be extremely useful to have a light-weight, compact, high-voltage and high-energy device that could be used to deposit a charge into a partially discharged battery. Specifically, there is a need for a light-weight, compact, high-voltage and high-energy device that can easily be attached to a car's electrical system, and that can produce a high voltage which can be used to deliver a high current to the car's battery for a short period of time so that the car may be started. The present invention provides all of these advantages.

SUMMARY OF THE INVENTION

Broadly, the present invention concerns a method and apparatus that provides an efficient way to deposit a charge to a target battery. The method and apparatus satisfy the need for a small, light-weight, and disposable system for depositing such a charge. The most common application for which the present invention is directed is an automobile battery.

A light-weight, portable energy source, capable of producing an over-voltage which is substantially greater than the voltage of the target battery is used to deposit the charge. The energy source is capable of producing and delivering a substantial current to the target battery over a period of time. The target battery is the battery into which the charge from the portable energy source will be deposited. In one embodiment, the target battery is a secondary battery which has plates submerged in an electrolytic solution. The battery is usually used as an energy storage device and transfers energy through the interaction of the electrolytic solution with the plates. As the target battery discharged, a passivation substance forms within the plates of the target battery.

To deposit a charge from the light-weight portable energy source to the target battery, the energy source is electrically connected to the target battery. The energy source produces an overvoltage, which is substantially greater than the voltage of the target battery. For example, if the target battery is a 12 volt battery, similar to that found in an automobile, then the overvoltage created by the energy source would be substantially greater than 12-volts. Preferably, a minimum of 18-voltage would be used. Optimally, in one embodiment, 36-volts are applied. When the overvoltage is delivered to the target battery, a high current is generated and the electrolyte surrounding the plates of the target battery is quickly and substantially sequestered into the pores integral to the plate surfaces. The plate surfaces are manufactured with the pores in order to maximize the surface area available to react with the electrolyte upon discharge. The overvoltage causes substantial current to flow and the presence of the electrolyte to be increased over the presence of electrolyte if a charge, which was not substantially greater than the voltage of the target battery, were delivered.

Rapid charging results in a rapid reduction of the passivation substance formed on the plates of the target battery. The passivation substance forms as a product of a chemical reaction which occurs when the target battery discharges. Because of the overvoltage applied by the present invention, the chemical reaction is in essence reversed, causing rapid reduction of the passivation substance at a substantially accelerated rate over the reaction which occurs if a lesser voltage is used to recharge the battery.

The rapidity with which the passivation substance is reduced from the plates combined into the electrolytic solution because of the over-voltage and current flow delivered affords its users with a number of distinct advantages. Generally, the invention allows the plates of the target battery to warm at the interface of the plates and the electrolyte. The warming of the plates is beneficial to the performance of the target battery at low temperatures because batteries in general perform better when maintained above the ambient temperature. For example, an automotive battery which would be capable of delivering sufficient energy to the starter of the automobile in order to start the engine if the ambient temperature were 72 degrees Fahrenheit may not be able to supply adequate energy to the car's starter to start the engine if the ambient temperature were zero degrees Fahrenheit. This occurs because of a decrease in the speed of the chemical reaction within the battery. The decreased speed of the chemical reaction results in a reduction in conversion of chemical energy into electrical energy. By warming the plates at the interface of the plates in the electrolyte, the chemical reaction that generates current is increased. Because the chemical reaction increases, the battery is able to deliver sufficient energy at zero degrees Fahrenheit ambient temperature to the starter in order for the car's engine to be turned over. Additionally, the removal of passivated material from the surface of the plates reduces electrical resistance and increases the area of potentially chemically reactive plate material, further increasing the current producing capacity of the target battery.

Another benefit is that the invention allows the voltage in a discharged target battery to be significantly increased in a short period of time. An example would be the battery in an automobile that has been discharged by repeated cranking of the car's starter motor. Once the battery has been sufficiently discharged to where it can no longer deliver adequate energy to the starter in order to turn the car's engine over, the present invention may be connected to the discharged target battery. Because of the overvoltage produced by the portable energy source of the present invention, a sufficient charge can be rapidly deposited to the battery within a few minutes which then allows the target battery to deliver sufficient energy to the starter to turn-over the car's motor.

Another benefit is that the present invention is small, in its preferred embodiment, compact, light-weight and disposable. Typically, the present invention will fit into the palm of a human hand and store neatly within the glove-box of an automobile. In one embodiment it is easily attached to the target battery by virtue of a connector which "plugs into" the cigarette lighter of the automobile. The cigarette lighter is integrated into the car's electrical system and is indirectly electrically connected to the target battery.

Generally, the current invention fulfills the need for a small, compact, and light-weight portable energy source capable of producing an overvoltage which is substantially greater than the voltage of the target battery, and which delivers a substantial current flow rapidly to a target battery. The delivery of the overvoltage allows for the target battery to have a charge rapidly deposited into it from a small, external energy source, sufficient to allow a serviceable discharged target battery to be placed back into service.

BRIEF DESCRIPTION OF THE DRAWING

Nature, objects and advantages of the invention will become more apparent to those skilled in the art after considering the following detailed description in connection with the accompanying drawing, in which like reference numerals designate like art throughout, wherein.

DETAILED DESCRIPTION OF THE PREFERRED EMBODIMENTS

Figure 1:
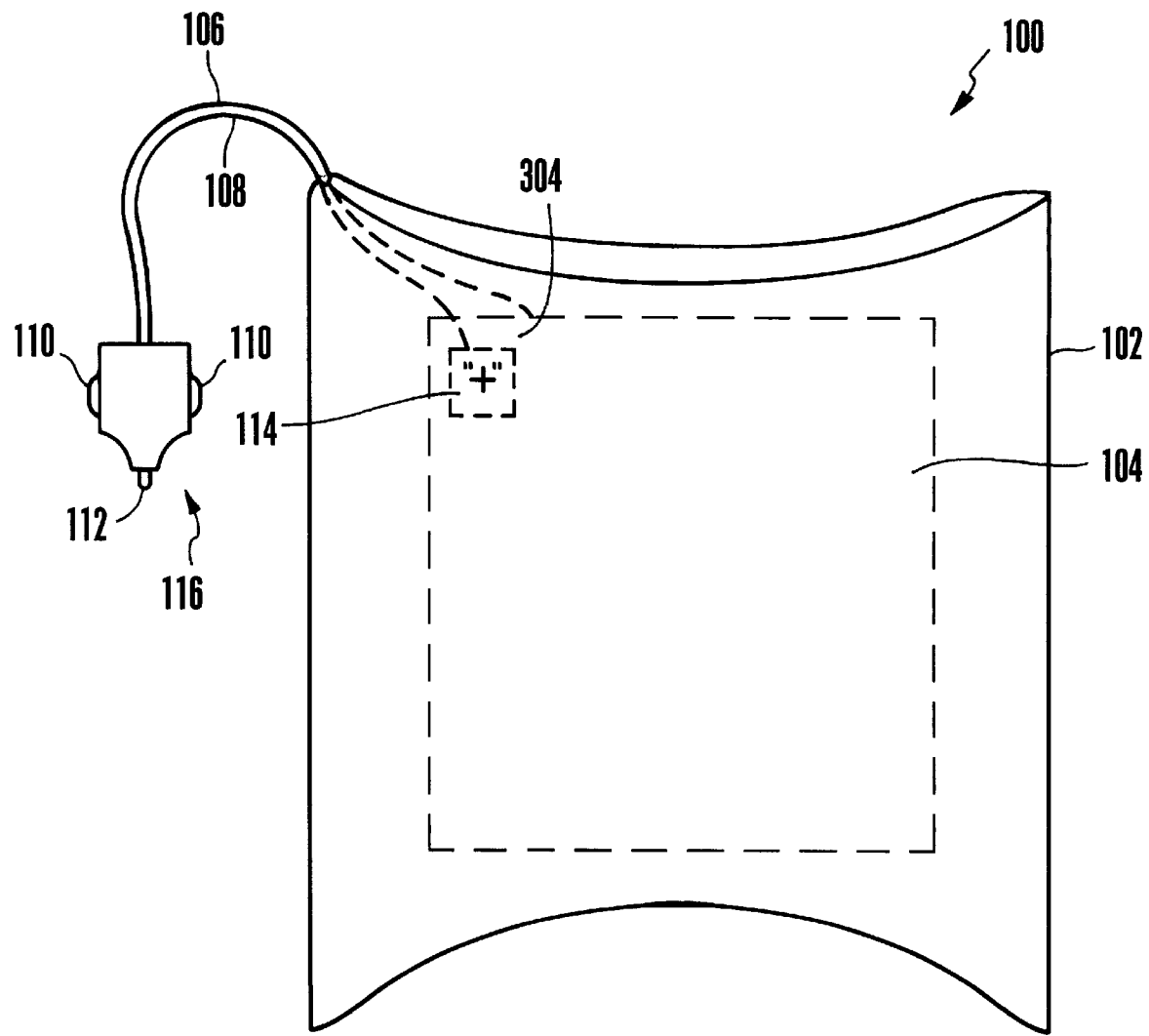
FIG. 1 is a prospective view showing the external configuration of one embodiment of the present invention.

One aspect of the invention concerns an apparatus that is small in size, compact, light-weight, and which provides an efficient way to deposit a sufficient current driven by an overcharge voltage within a partially discharged target battery. One example of this apparatus is shown in FIG. 1 by various hardware components are interconnections. In FIG. 1, an external configuration 100 of the apparatus is shown. A container 102, having a thin outer shell, surrounds and encloses a battery cell 104. For clarity of this discussion, only one battery will be used in discussing the present invention relative to the container 102 unless otherwise stated.

It should be understood that the container 102 can accommodate one or more batteries. Because the battery cell 104 produces considerable heat and expands when discharged, the "pillow-pack design" of the container 102 is preferred. The container 102 contacts the battery 104 along its peripheral edges, thereby allowing the heat that is produced by battery during discharge to be minimally transferred to the container 102. By reducing the heat transference to the container, the "pillow-pack design" of the container 102 prevents a user of the present invention from becoming startled due to unpleasant warming of the package during discharge of the battery 104.

A further benefit of the pillow-pack design is that the container 102 does not noticeably distort due to the expansion of the battery 104. Furthermore, the container's shape is attractive, compact, and fits well into a small storage space, as well as being sturdy and inexpensive to produce. A contact 114 is shown on the battery cell 104 positioned towards a terminal end 304. The contact 114 is shown as a anode contact. A second contact (not shown) is positioned on the opposite side of battery cell 104. Two electrically connecting elements 106 and 108—element 106 extending from anode-connector 114, and the element 108 extending from the not shown cathode-connector —exit the container 102 and are electrically attached to a connector 116. Electrical connection elements 106 may be housed within an insulative sleeve. The electrical connector 106, which extends from anode-connector 114, is electrically connected to a tip 112 of connector 116. Electrical connected element 108 which extends from cathode-contact is electrically connected to the arms 110 of connector 116.

The arms 110 extend from the connector body 116 and are retractable into the connector 116 when pressure is applied to the outside of the arm 110. For example, if the connector 116 were placed in the cigarette lighter outlet of an automobile, arms 110 would be depressed by the walls of the cigarette lighter outlet as the connector 116 was inserted into the cigarette lighter outlet. Similarly, the tip 112 is retractable so that it can depress into the connector 116 when the connector is plugged into the cigarette lighter of a car. The arms 110 are used to connect to the cathode side of the cigarette lighter; the tip 112 connects to the anode side of the lighter. The cigarette lighter is electrically connected to the target battery via the car's electrical system.

Although a cigarette lighter connector is pictured in FIG, any variety of connectors could be used. For example, alligator clips, wire ties, screws, or any type of conductive fastener could be used to attach electrical connecting elements 106 and 108 to the anode and cathode-terminals, respectively, of a target battery.

Figure 2:
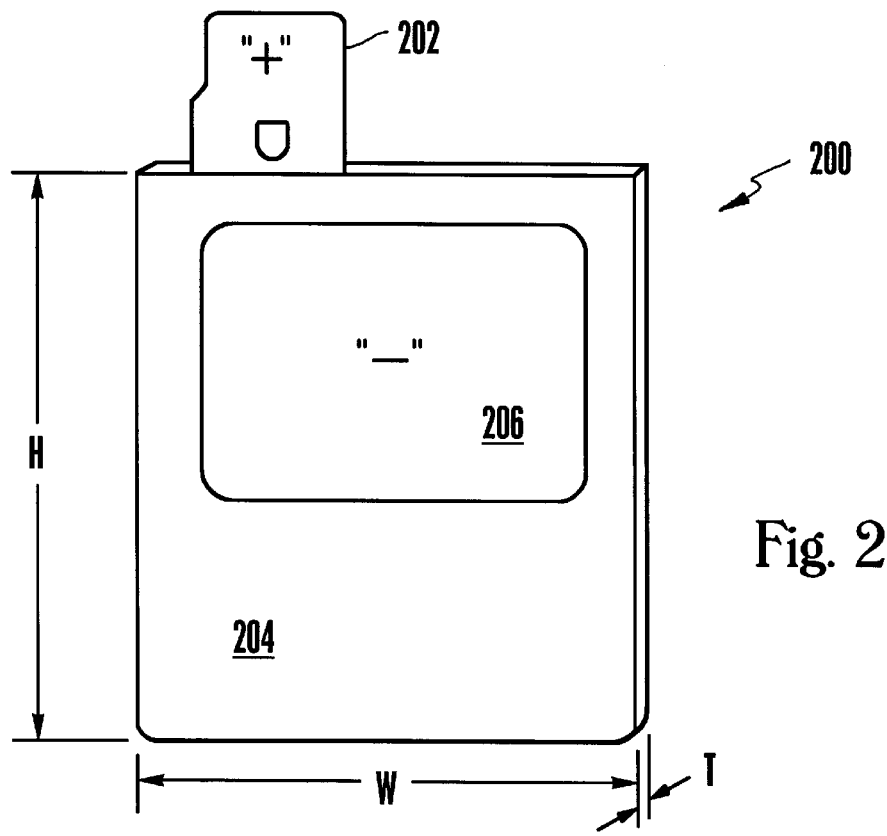
FIG. 2 is a diagram of a battery cell used as an energy source in one embodiment pursuant to the present invention.
Figure 3:
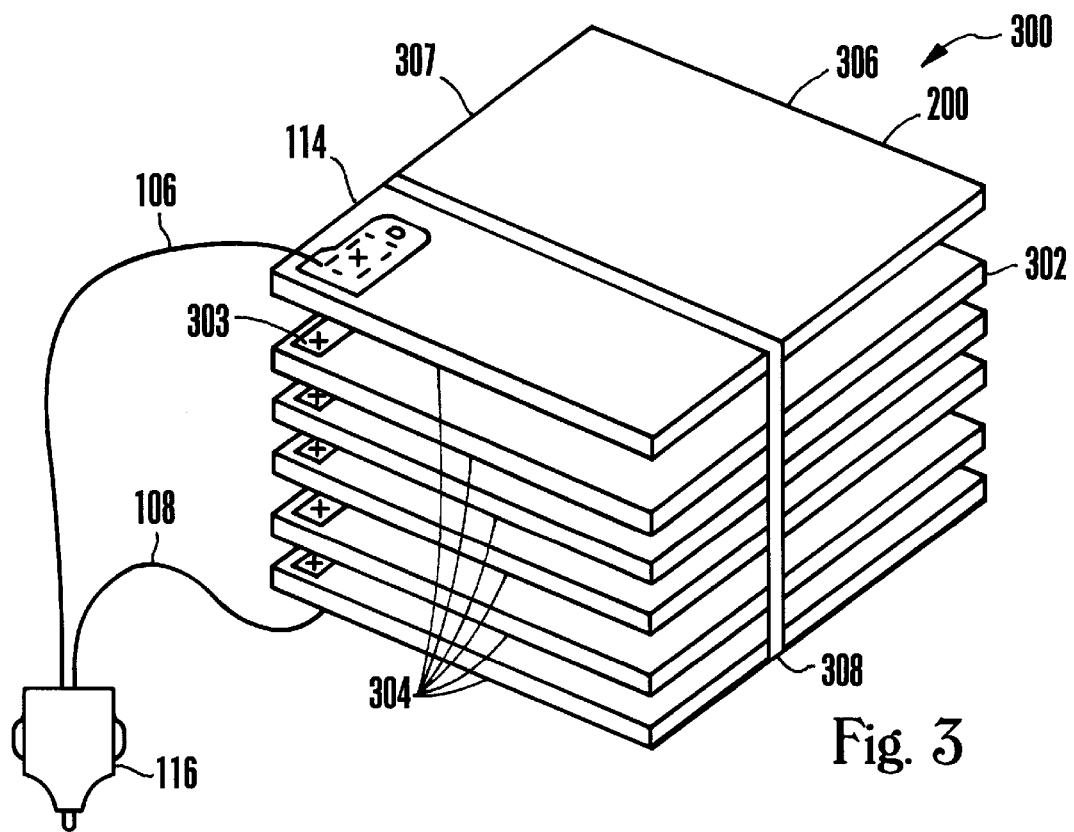
FIG. 3 is a prospective view depicting an exemplary configuration of multiple battery cells as used in one embodiment of the present invention as shown in FIG. 2.

FIG. 3 shows a typical battery used in one example of the present invention. For ease of explanation, but without any limitation intended thereby, the example battery of FIG. 3 is described in the context of a zinc manganese oxide primary cell battery. In the preferred embodiment, a battery 200 is less than four inches in height, four inches wide and one-half of one inch thick. The direction in which height, width, and thickness is measured is shown in FIG. 2 and referenced as H, W, and T, respectively. However, batteries which are dimensionally larger may be used as long as they are lightweight and have substantial plate face area.

The battery 200 is enveloped in a thin insulative layer 204. An opening 206 may appear over the cathode side of the battery and is marked with a negative ("−") symbol in FIG. 2. A tab 202 extending from the anode side of the battery is also shown. The tab 202 extends through the insulative layer 204 and may be positioned vertically, as shown, or positioned an any fashion to facilitate connection of the battery 200 with another battery or to a target battery. If more than one battery is used, the batteries may be connected in series in order to increase the overall voltage and current generating capacity of the invention.

An example of one configuration of the present invention is shown in FIG. 3. Six batteries shown in FIG. 2 are connected in series. A tab 303 of battery 302 folds back and extends parallel to the anode side of the battery 200 and rests on top of the insulative layer 307. To position the battery 302 in series with the other batteries, battery 302 is positioned immediately next to, e.g., the battery 200, so that the tab 303 contacts the open surface 206 of the adjoining battery. In this way, any number of batteries may simply be connected to an adjoining battery. In order to prevent the tab 303 from separating from the anode side of the adjoining battery 200, a retaining means is used to press the batteries together.

One means for pressing the batteries together, is to use a plastic tie 308 around the batteries, as shown in FIG. 3. Other means such as tape, string, or other securing materials may be used. The plastic tie 308 extends around the perimeter of the combined batteries and is positioned near the terminal end 304 of the batteries. Positioning the retaining means towards the terminal end 304 of the batteries allows the distal end 306 "fan-out" when the batteries expand during discharge. In essence, the batteries will cantilever about the retaining means placed towards the terminal end 304 during discharge. This "fanning-out" of the batteries at the distal end 304 increases the pressure placed on the tab 303 by any adjoining battery.

As indicated i FIG. 1, contact 114 is used to attach electrical connecting element 106 to the arm 110 of connector 116. Similarly, the cathode contact (not shown( is connected to the tip 112 of connector 116 by electrical connecting element 108. The electrical connecting elements may be secured to the anode and cathode terminals by twisting, soldering, taping, or otherwise electrically attaching the elements. The preferred embodiment is to tape the elements to the terminals using a conductive adhesive tape such as the 3M-1245 type embossed copper tape.

Figure 4:
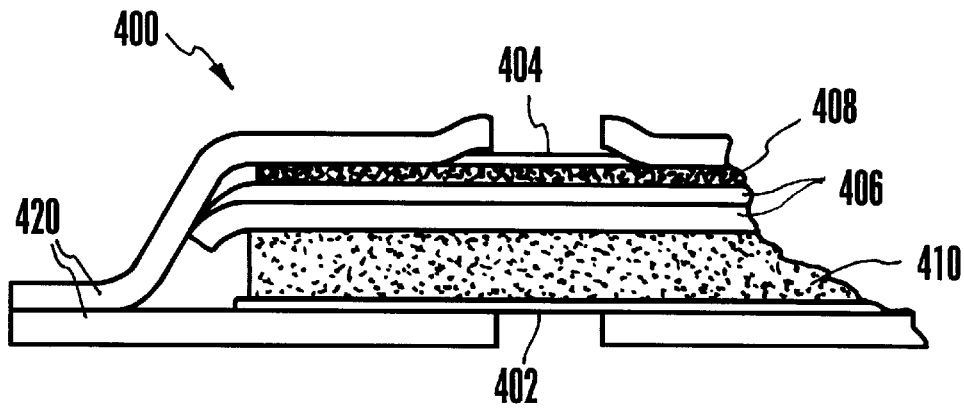
FIG. 4 is a cross-sectional view of a battery used in one embodiment of the present invention.

In one embodiment of the invention, a Leclanche cell is used as an energy source. FIGS. 4 and 5 show one configuration of a prior art Leclanche battery cell as used in the present invention. In FIG. 4, a zinc anode 408 is positioned opposite a cathode 410. The cathode may be manganese oxide, or any suitable material used for a cathode. The anode 408 and the cathode 410 are separated by separators 406, as shown. An insulative film 420 envelopes the anode 408, separators 406, and cathode 410. A negative terminal 404 is exposed by an opening in the insulative layer 420, and the positive terminal 402 is exposed through an opening in the insulative material 420. As used in the present invention, a tab 202 pictured in FIGS. 2 and 3 may extend from the positive terminal 402 in order to facilitate electrically connecting the battery 400 to another battery. Similarly, the negative terminal 404 may be an opening, such as opening 206, as shown in FIG. 2.

The insulative envelope 420 enveloping the battery 400 provides various benefits. One benefit, is that it insulates the battery from reacting with any elements other than the electrolyte internal to the battery. Another benefit is that it prevents the anode 408 or the cathode 410 from inadvertently coming into contact with a conductive surface and "shorting out" the battery. Another benefit is that it allows the battery to expand when the battery is discharged. Although only a few benefits are recited, numerous other benefits are provided this type of insulative film which will be readily apparent to one skilled in the art.

Figure 5A:
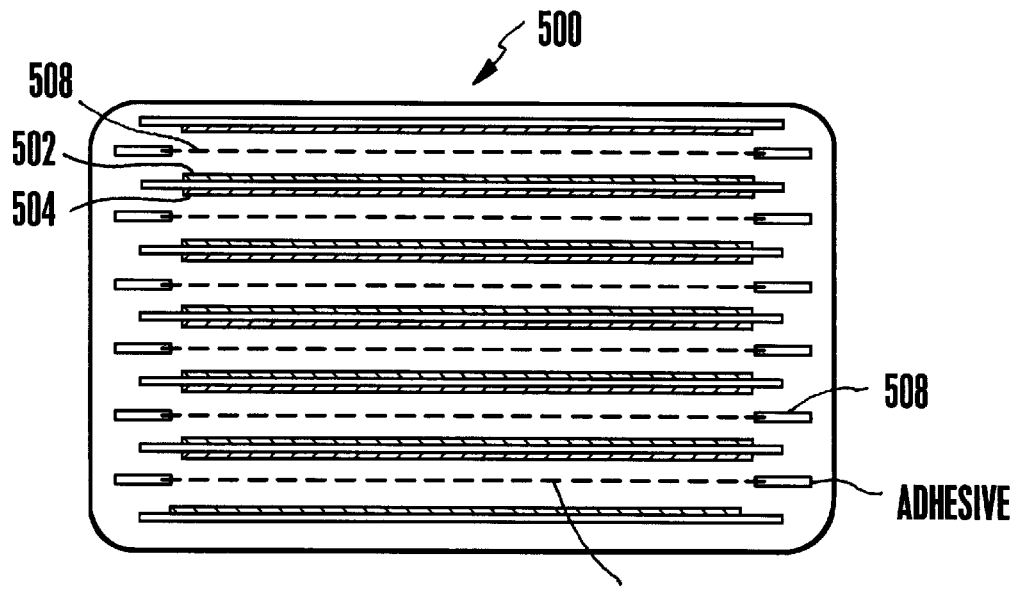
FIGS. 5a and 5b are a cross-sectional view of another embodiment of a battery used in one embodiment of the present invention. A detail of the construction of the duplex electrodes is shown in FIG. 5b.
Figure 5B:
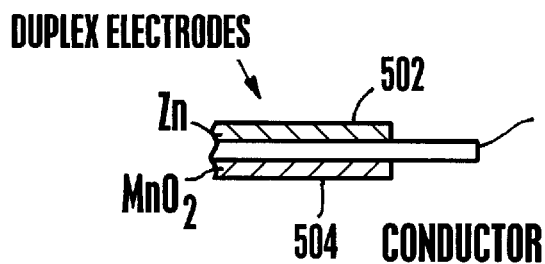

As mentioned above, FIG. 5 shows a prior art embodiment of a battery cell used in one embodiment of the present invention. FIG. 5a shows the orientation of a zinc anode 502 to a manganese oxide cathode 504. The zinc anode 502 is separated from the manganese oxide cathode by an electrolyte-impregnated netting 508. Both the cathode 504 and anode 502 are mixtures of a water-based latex binder that is applied or "painted" onto a conductive sheet and then dried. The thin synthetic netting 508 is impregnated with a jelled electrolyte, to separate the successive duplex electrodes, and to act as a support for the hot-melting ceiling compound around the battery perimeter. An insulative shell 512 envelops the battery elements 500. The insulative shell may contain openings, such as those shown in FIG. 4, in order to facilitate connecting the battery to other batteries. FIG. 5b shows a detailed cross-sectional view of the duplex electrodes. Although manganese oxide-zinc batteries have been discussed for illustrative purposes, any energy source capable of producing a sufficient over-voltage and having current generating capacity relative to the target battery may be used.

Figure 6A:
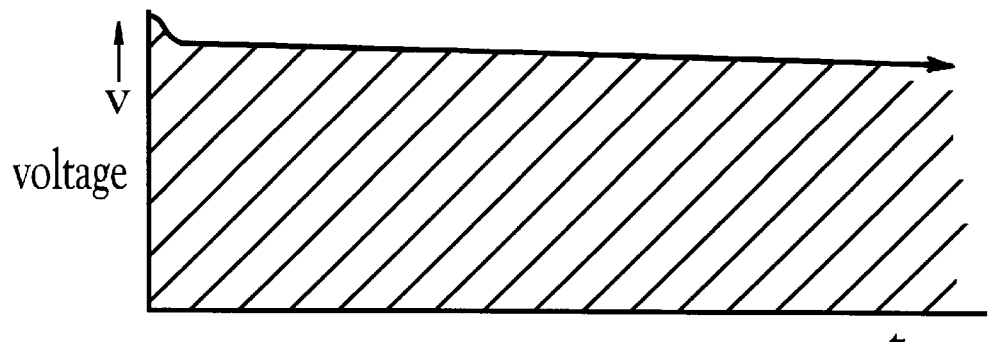
FIGS. 6a and 6b are graphs showing the voltage drop-to-time relationships for the prior art and the present invention.
Figure 6B:
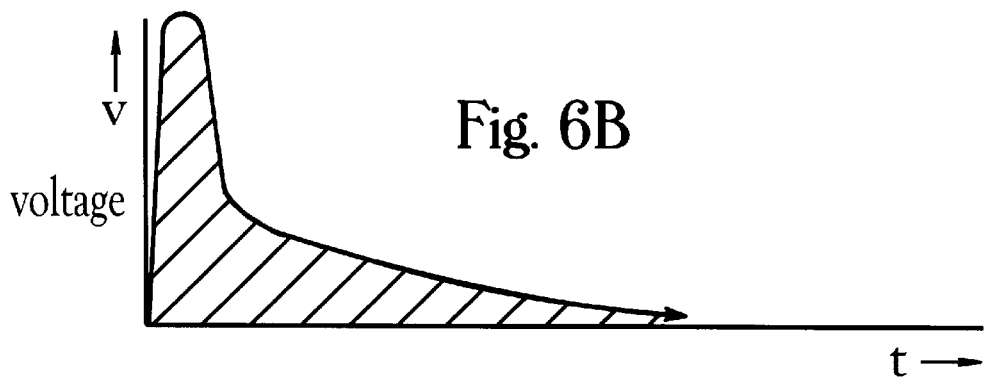

FIGS. 6a and 6b show that the flow of voltage to the target battery from the charging source for the prior art and the present invention, respectively. The prior art voltage shows a minimal drop after being connected to a target battery and a voltage which is maintained over a longer period of time. The present invention has a substantial voltage drop immediately after being connected to the target battery and is maintained over a short period of time.

Figure 7A:
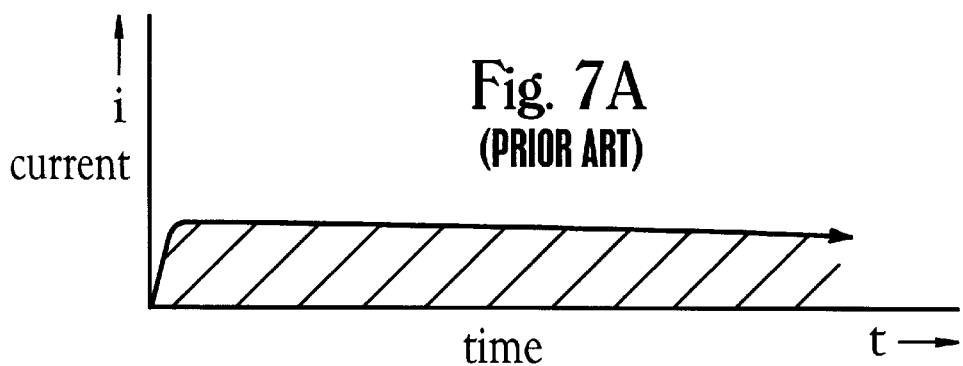
FIGS. 7a and 7b are graphs showing the current drop-to-time relationships for the prior art and the present invention.
Figure 7B:
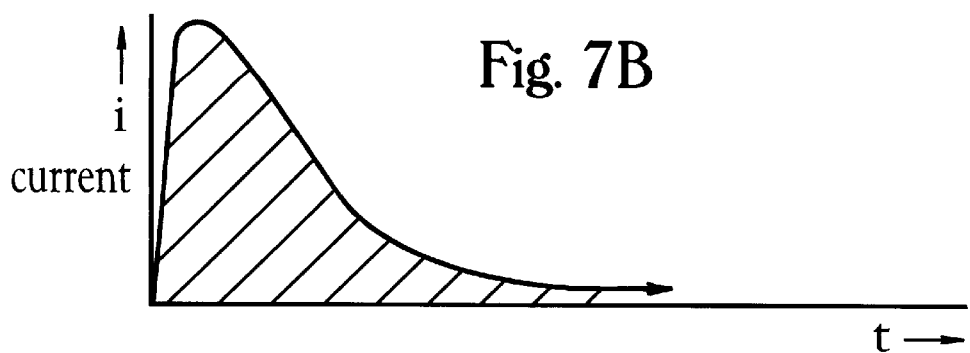

FIGS. 7a and 7b show the flow of current to the target battery from the charging source for the prior art and the present invention, respectively. The prior art current shows a minimal drop and a current which is maintained over a longer period of time. The present invention has a substantial current drop rapidly after being connected to the target battery and is delivered over a shorter period of time.

OTHER EMBODIMENTS

While there have been shown what are presently considered preferred embodiments of the invention, it will be readily apparent to those skilled in the art that various changes and modifications can be made herein without departing from the scope of the invention, as defined by the claims. For example, a zinc-air battery, a fuel cell, or, a lead-acid rechargeable battery or batteries could be used as a power source. Accordingly, the above description of the present invention should not be interpreted to limit the scope of the appended claims.

I claim:

1. An apparatus for rapidly depositing a charge within a battery, comprising:

a battery having an enclosure with a top side, wherein the battery has a voltage;

plates within the enclosure, wherein the plates are interconnected to form cells including anode and cathode electrodes;

an anode and a cathode terminal extending from the plates through the top cover;

an electrolytic solution surrounding the plates, wherein energy is transferred to and discharged from the target battery by the interaction of the electrolytic solution and the plates, and wherein passivation substance forms on the plates as the target battery is discharged;

a lightweight portable energy source, comprising one or more cells, wherein each cell comprises:
an anode element;
a cathode element opposite the anode element;
a separator element separating the anode element from the cathode element;
an electrolytic medium surrounding the elements;
an enclosure having an inside and an outside, wherein the inside of the enclosure surrounds the electrolytic medium;

a positive terminal contacting to the cathode element and providing an electrical contact outside the enclosure;

a negative terminal contacting the anode element and providing an electrical contact outside the enclosure;

a connector for electrically connecting the energy source to the battery, wherein the energy source produces an over-voltage when connected to the target battery sufficient to cause a passivation substance on the plates to rapidly and substantially dissolve away from the plates and combine into the electrolytic to reduce the plates' resistance to electrical forces present within the battery; and a positive contact and a negative contact, the positive contact electrically connected to cathode contact outside the enclosure and the negative contact electrically connected to the anode contact outside the enclosure, and wherein the connector can be inserted into a cigarette lighter or other electrical contact in electrical continuity with the car battery;

wherein the energy source is contained in a palm-sized package, the package comprising:
a thin outer shell having a primary side and an adjacent side, each side including a first edge, opposite a second edge, and a distal end opposite to a proximate; and
an enclosure formed between the two sides, wherein the first edge of the primary side is joined to first edge of the adjacent side, and wherein the second edge of the primary side is joined to the second edge of the adjacent side, and wherein the distal end and the proximal end of the sides cooperate to cause the enclosure to be enclosed at one or both ends.

2. The apparatus recited in claim 1, wherein the passivation substance is lead sulfate.

3. The apparatus recited in claim 1, wherein the energy source is a fuel cell.

4. The apparatus recited in claim 1, wherein the energy source comprises one or more batteries electrically connected in series, wherein the batteries produce a minimum voltage of 36-volts.

5. The apparatus of claim 2, wherein the target battery is a 12-volt battery.

6. A method for treating a target battery, the target battery having plates submerged in an electrolyte, energy being transferred to and discharged from the target battery by an interaction of the electrolyte with the plates, and wherein a passivation substance forms in the plates as the target battery is discharged, the method comprising the steps of:

connecting an energy source to the target battery using a connecting means, the target battery having a target battery voltage, and the connecting means comprising:
a body;
a positive contact cooperating with the body;
a negative contact cooperating with the body to electrically connect the energy source to the connector, and wherein the connector is inserted securely into a cigarette lighter of an automobile to electrically connect the connector to the target battery;

delivering an over-voltage from an energy source which is substantially greater than the target battery voltage;

using the over-voltage to rapidly deposit a substantially current to the target battery; and wherein the energy source is contained in a palm-sized package, the package comprising:
a thin outer shell having a primary side and an adjacent side, each side including a first edge opposite a second edge, and a distal end opposite to a proximate end, and
an enclosure formed between the two sides, wherein the first edge of the primary side is joined to first edge of the adjacent side, and wherein the second edge of the primary side is joined to the second edge of the adjacent side, and wherein the distal end and the proximal end of the sides cooperate to cause the enclosure to be enclosed at one or both ends.

7. An apparatus for regenerating a charge within a target battery, the target battery having plates submerged in an electrolytic solution, the energy being transferred to and discharged from the target battery by the interaction of the electrolyte and the plates, and a passivation substance forming in the plates as the target battery is discharged, comprising:

a lightweight portable energy source capable of producing an over-voltage which is substantially greater than the voltage of the target battery, wherein the over-voltage causes:

the electrolyte surrounding the plates of the target battery to be quickly and substantially regenerated and driven into pores integral to the plate surfaces, to increase the presence of the electrolyte adjacent to the plates and within the pores;

warming of the plates;

conversion of a passivation substance held within the plates into the electrolytic solution surrounding the plates;

an increase in the target battery voltage;

reduction of the plate resistance to electrical forces present within the target battery; and a connector for connecting the energy source to the target battery;

a thin outer shell having a primary side and an adjacent side, each side including a first edge opposite a second edge, and a distal end opposite to a proximal end; and an enclosure formed between the two sides, wherein the first edge of the primary side is joined to first edge of the adjacent side, and wherein the second edge of the primary side is joined to the second edge of the adjacent side, and wherein the distal end and the proximal end of the sides cooperate to cause the enclosure to be enclosed at one or both ends.

8. The apparatus recited in claim 7, wherein the lightweight portable energy source is no larger than 6-inches in width, 6-inches in height, and 2-inches thick when not discharged.

* * * * *